United States Patent [19]
Brown et al.

[11] 3,907,143
[45] Sept. 23, 1975

[54] FRONT END LOADER FOR TRACTORS

[76] Inventors: Silas A. Brown, 9350 N. 31st St., Lake Elmo, Minn. 55042; Herbert M. Brown, Box 5, Harrisburg, S. Dak. 57032

[22] Filed: Feb. 14, 1974

[21] Appl. No.: 442,633

[52] U.S. Cl. ............................... 214/768; 214/141
[51] Int. Cl.² ........................................ E02F 3/74
[58] Field of Search ........... 214/768, 770, 141, 140, 214/131, 730

[56] References Cited
UNITED STATES PATENTS

| | | | |
|---|---|---|---|
| 2,896,806 | 7/1959 | Vossenberg | 214/730 |
| 3,024,927 | 3/1962 | Quayle | 214/131 |
| 3,198,358 | 8/1965 | Gardner | 214/768 |
| 3,327,879 | 6/1967 | Lull | 214/141 |

FOREIGN PATENTS OR APPLICATIONS

| | | | |
|---|---|---|---|
| 976,385 | 7/1963 | Germany | 214/730 |

*Primary Examiner*—Frank E. Werner
*Assistant Examiner*—Ross Weaver
*Attorney, Agent, or Firm*—James R. Haller; H. Dale Palmatier

[57] ABSTRACT

A hydraulically-actuated front end loader for a tractor is provided with an extendible, hinged structure connecting an earth-working tool to overhead booms mounted on the tractor, the hinged structure permitting the earth-working tool to be extended, retracted, and turned to the left or the right with respect to the tractor.

6 Claims, 3 Drawing Figures

FRONT END LOADER FOR TRACTORS

BACKGROUND OF THE INVENTION

A loader which is mountable to a tractor such as a small garden tractor should be capable of not only exerting great lifting force on snow, earth and the like, but should further be capable of lifting such material upwardly and forwardly so the same may be easily deposited in a pile or in a truck or other receptacle. In addition, a front end loader should be sufficiently versatile as to enable earth or other material to be moved from one place to another with minimum movements of the tractor itself. Numerous loader designs have been proposed, but few of these have become commercially attractive.

BRIEF DESCRIPTION OF THE INVENTION

The present invention relates to a front end loader for a tractor. The loader includes a pair of vertically movable, hydraulically actuated overhead booms which are carried longitudinally of the tractor and which terminate in a transverse support bar connecting the booms forwardly of the tractor. The loader includes an earth-moving tool, such as a scoop or a blade adapted to load earth, shovel snow, etc., which is supported by a transverse tool frame. A connector bar extends between opposed ends of the transverse support bar and the tool frame and is connected to the bar and the frame by hinges permitting movement in a common plane of the tool frame and the transverse support bar. Separately operable hydraulic jacks respectively connect the tool frame to the connector bar and the connector bar to the transverse support bar. The earth-working tool may thus be extended or retracted by simultaneous operation of the hydraulic jacks, and may be faced to the left or to the right with respect to the tractor by operation of one of the hydraulic jacks. By concurrent extension of the earth-working tool and raising of the overhead booms, the earth-working tool may reach upwardly and forwardly of the tractor to deposit earth or other material in a desired place.

DETAILED DESCRIPTION OF THE PREFERRED EMBODIMENT

Figure 3:
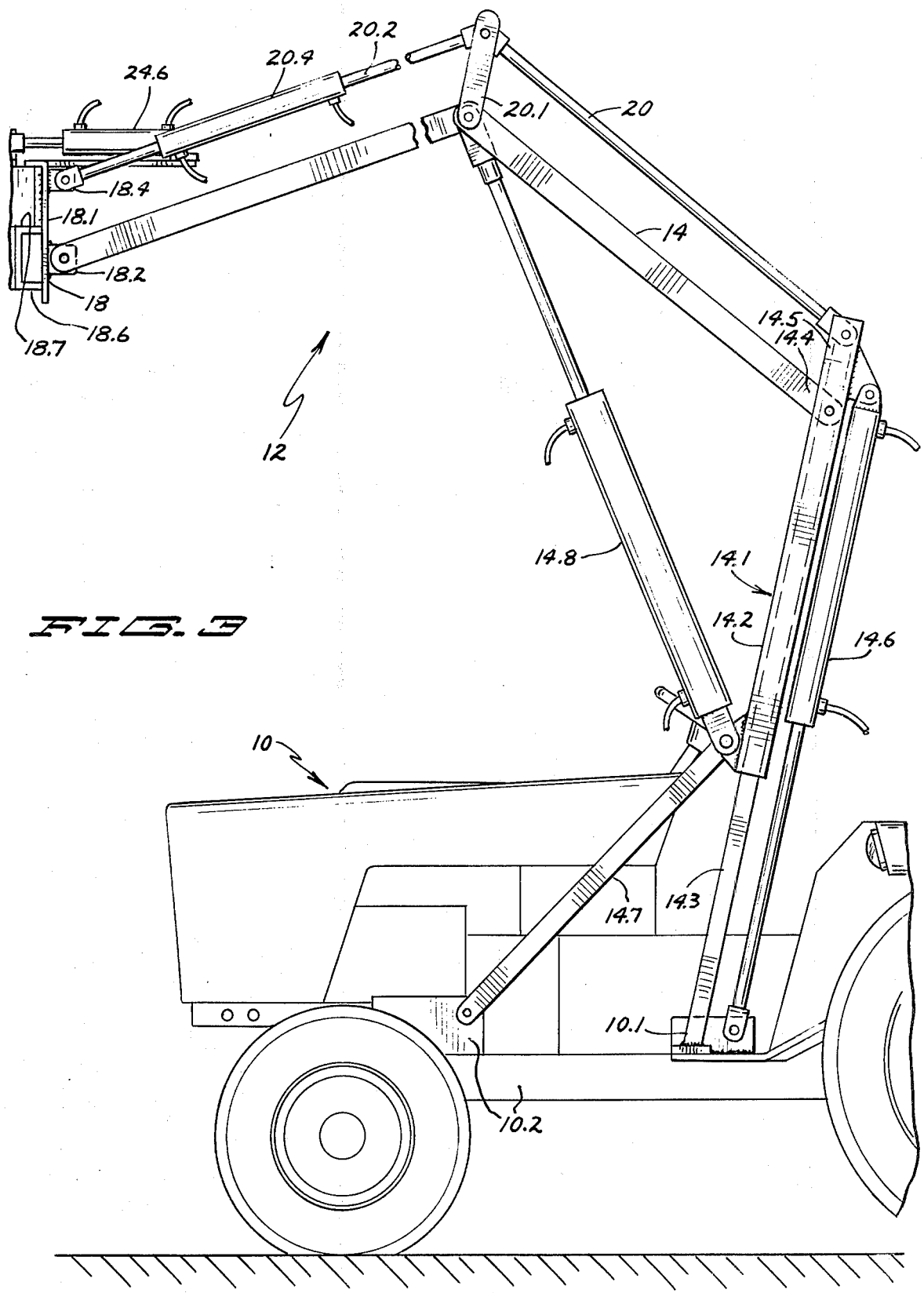
FIG. 3 is a partially broken away view of the front end loader of the invention showing the overhead booms in a raised position.

With reference to the drawing, numeral 10 designates a tractor upon which is mounted the front end loader 12 of the invention. The front end loader includes a pair of overhead booms 14, 16 which are mounted to the tractor by upright braces 14.1 (FIGS. 1 and 3), the lower ends of the braces being mounted rigidly to the frame of the tractor at 10.1. Each brace includes a pair of telescoping struts 14.2, 14.3 which are slidable one upon the other, and the booms are hingedly mounted at their rearward ends 14.4 to the upper ends 14.5 of the upwardly extendible struts 14.2. A pair of upright, simultaneously operable hydraulic jacks 14.6 extend between the tractor frame and the upper ends 14.5 of the upwardly extendible struts 14.2, simultaneous extension of the jacks 14.6 causing the extendible struts 14.2 to slide upwardly upon the struts 14.3 to elevate the booms. An elongated, rigid brace 14.7 extends between the upper end of the rigid strut 14.3 and the tractor frame 10.2 forwardly of the point at which the strut 14.3 is mounted to the frame, the braces serving to prevent forward movement of the upright struts.

A second pair of parallel, simultaneously operable hydraulic jacks 14.8, 14.9 each are respectively mounted at one end to an upwardly extendible strut 14.2 and is pivotally mounted at the other end to one of the booms at a point intermediate the length of the latter. The relative angular orientation of the booms with respect to the ground is thus independent of the degree of the extension of the struts 14.1, and is dependent solely upon the degree of extension of the hydraulic jacks 14.8, 14.9.

Each boom 14, 16 has a downward bend intermediate its length so that the forwardly extending ends of the booms are ordinarily closer to the ground than are the rearward ends of the booms. The hydraulic jacks 14.8, 14.9 desirably are connected to the booms at the points of the downward bends.

A transverse support bar 18 connects the booms 14, 16 at their forward ends forwardly of thee tractor. The support bar 18 comprises a vertical plate 18.1 having adjacent its lower edge rearwardly extending ears 18.2, 18.3 to which forward ends of the booms are hingedly mounted.

Extending parallel to the rearward sections of the booms 14, 16 and carried parallel above the booms are parallel links 20, 22, the links being pivotally connected at their rearward ends to the upper end of the extendible braces 14.2 and at their forward ends to upwardly extending ears 20.1, 22.1 which in turn are mounted at their lower ends to the booms 14, 16 at the downward bend in the booms. A second pair of connecting links 20.2, 22.2 join the upwardly extending ears 20.1, 22.1 to rearwardly extending ears 18.4, 18.5 which extend rearwardly from the vertical plate 18.1 adjacent its upper edge. Each of the links 20.2, 22.2 includes a hydraulic jack 20.4, 22.4. Extension of the latter hydraulic jacks causes the plate 18.1 to tip downwardly. The parallel links 20, 22, 20.2, 22.2, operate to maintain the vertical plate 18.1 in constant orientation with respect to the ground as the booms are raised and lowered by the simultaneously operated hydraulic jacks 14.8, 14.9, although the orientation of the plate may be varied, as aforesaid, by operation of the hydraulic jacks 20.4 and 22.4.

Mounted to the forward surface of the vertical plate 18.1 and adjacent the bottom edge of the plate is a transversely extending, C-shaped channel 18.6, the upper surface of which provides an upwardly facing ledge, or shoulder, 18.7.

Figure 1:
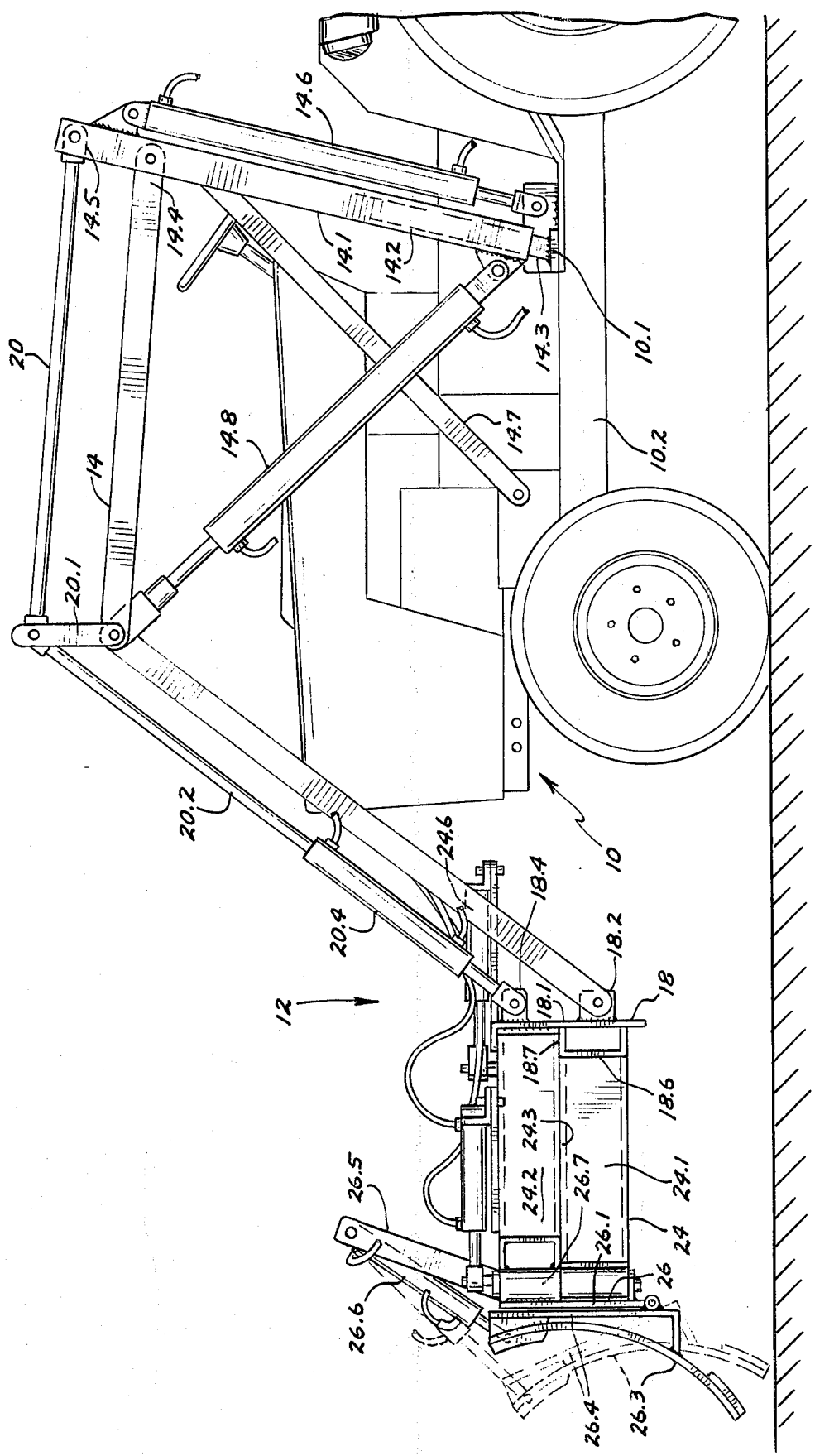
FIG. 1 is a side elevation, partially broken away, of the front end loader of the invention mounted upon a garden tractor, dashed lines indicating a downwardly tipped position of an earth-working tool.

A connector bar 24, which is of substantially the same length as the transverse support bar 18.6, is provided with a vertical plate 24.1 which has adjacent its top edge a rearwardly extending, C-shaped channel 24.2, the lower surface of which provides a downwardly facing ledge or shoulder 24.3 (FIG. 1). Another C-shaped channel 24.4 is mounted to the forward surface of the vertical plate 24.1 adjacent its bottom edge to provide an upwardly facing shoulder or ledge 25. The connector bar 24 is mounted at one end to an end of the transverse support bar 18 by a strong, vertical hinge 24.5 (FIG. 2) which permits the connector bar 24 to swing away from and toward the transverse support bar 18. A hydraulic jack 24.6 is pivotally mounted to a support plate 18.8 which is rigidly mounted rearwardly of the vertical plate 18.1 of the transverse support bar, and the forward end of the hydraulic jack 24.6 is pivotally mounted at 24.7 to the connector bar 24 at the upper surface of the C-shaped channel 24.2, all as most clearly shown in FIG. 2. The hydraulic jack 24.6, when actuated, causes the connector bar 24 to swing toward or away from the transverse support bar 18, and when the connector bar is in its completely retracted position against the transverse support bar, downwardly facing ledge 24.3 of the connector bar rides upon and is supported by the upwardly facing ledge 18.7 of the support bar, thus reducing the stress upon the hinge 24.5.

An elongated tool frame 26 is provided with an elongated vertical plate 26.1 having adjacent its upper edge a rearwardly extending C-shaped channel 26.2 (FIG. 2), the lower surface of which channel provides a downwardly facing ledge or shoulder (not shown) similar to that provided by the C-shaped channel 24. An earth-moving tool 26.3, which may be a blade or shovel or other tool adapted to move earth, snow, or the like, is provided with a rearward mounting plate 26.4 which is hingedly connected at its bottom edge to the bottom edge of the vertical plate 26. An upright mounting ear 26.5 is rigidly mounted to the upper surface of the C-shaped channel 26.2, and to the upper end of this mounting ear is pivotally attached a hydraulic jack 26.6, the other end of the jack being pivotally attached to the upper edge of the blade 26.3. Actuation of the hydraulic cylinder 26.6 causes the mounting plate 26.4 to pivot about its hinged connection to the vertical plate 26.1, thus enabling the blade to be tipped downwardly and upwardly with respect to the ground as shown in FIG. 1.

Figure 2:
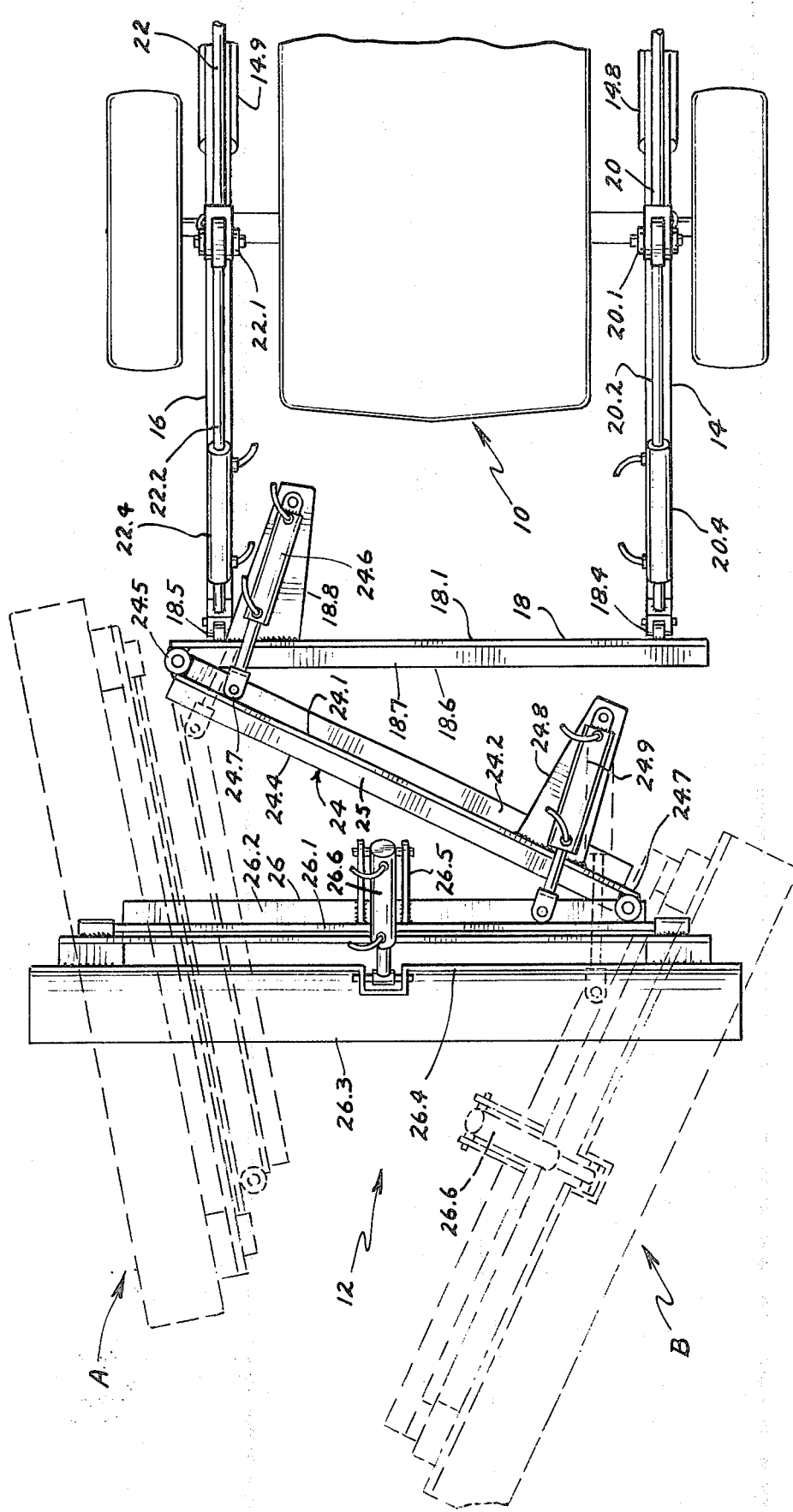
FIG. 2 is a top view of the front end loader of the invention shown partially broken away, dashed lines showing left-facing and right-facing positions of the earth-working tool.

The tool frame 26 is mounted at one end to the other end of the connector bar 24 by means of a strong, vertical hinge 26.7, the connector bar 24 thus connecting opposed ends of the tool frame 26 and the transverse support bar 18 to provide an "N" shaped structure as shown in FIG. 2. A rearwardly extending mounting bracket 24.8 is rigidly attached to the upper surface of the C-shaped channel 24.2 of the connector bar adjacent the hinged connection of the connector bar to the tool frame. A hydraulic jack 24.9 is mounted at one end to the end of the bracket 24.8 and at the other end to the upper surface of the C-shaped channel 26.2, such that actuation of the hydraulic jack 24.9 causes the tool frame to retract toward or extend away from the connector bar. When the tool frame is completely retracted against the connector bar, the downwardly facing shoulder or ledge provided by the C-shaped channel 26.2 of the tool frame rides upon and is supported by the upwardly facing ledge 25 provided by the C-shaped channel 24.4 of the connector bar, thus reducing the strain upon the hinge 26.7.

The hydraulic lines leading from the various hydraulic jacks extend into a control box (not shown) positioned within easy reach of the operator, the control box supplying hydraulic fluid from the tractor's hydraulic system to the various jacks. It will be understood that the hydraulic jacks 20.4 and 22.4 are simultaneously operable, i.e., are always operated together, as by movement of a single control lever, as are the jacks 14.8, 14.9 and the jacks 14.6. The jacks 24.6 and 24.9 are separately operable (as by movement of separate control levers) to enable the tool to be faced toward one side or the other of the tractor, but may be operated concurrently to move the tool forwardly or rearwardly with respect to the tractor.

The sturdy, vertical hinges 26.7 and 24.5 maintain the tool frame, the connector bar and the transverse support bar in the same plane regardless of the extension or retraction of these members. Operation of one or more of the hydraulic cylinders 24.9, 24.6 and the pair of hydraulic cylinders 20.4 and 20.5 provides great versatility in positioning of the blade 26.3. For example, let it be assumed that the connector bar 24 and the tool frame 26 are in their completely retracted positions so that the mating shoulders or ledges provided by the C-shaped channels nest together. Let it further be assumed that the hydraulic jacks 20.4 and 22.4 are adjusted so that the tool frame, connector bar and transverse support bar lie in a plane horizontal to the ground. Now, by extending the hydraulic jack 24.6, the blade 26.3 is caused to assume the position designated generally by A in FIG. 2, the blade now facing to the right hand side of the tractor 10 and permitting snow or earth or other material to be unloaded at the side of the tractor, out of the path of the tractor wheels. If the connector bar 24 is now retracted to the position shown in solid lines in FIG. 2 by activation of the hydraulic jack 24.6, then by activation of the hydraulic jack 24.9, the blade may be made to assume the front-facing position shown in solid lines in FIG. 2. Further activation of the hydraulic jack 24.9 causes the blade to assume the position shown in dotted lines and designated B in FIG. 2, the blade in this latter position permitting material to be unloaded to the left side of the tractor. It will be understood that when the tool frame and connector bar are in their completely retracted positions, activation of either of the hydraulic jacks 24.6, 24.9 will cause the blade to move bodily to one side of the tractor or the other.

Assume now that the hydraulic jacks 20.4, 20.5 have been extended slightly so that the common plane of the tool frame, connecting bar and transverse support bar is angled forwardly and downwardly with respect to the ground. It will be understood that the biting edge of the blade 26.3 is parallel to the ground only when the blade is facing directly to the front. By turning the blade to the left or to the right by activation of either of the hydraulic jacks 24.6 or 24.9, the bottom or biting edge of the blade will assume an angle with respect to the surface of the ground, and if the tractor is driven in a forward direction when the blade is so oriented, the blade will tend to scrape earth or snow into a row or pile which slopes upwardly away from the line of travel of the tractor.

Assume, thirdly, that the tool frame and the connector bar are in their fully retracted positions with the mating ledges or shoulders of the tool frame, connector bar and support bar nesting together in supportive contact and their common plane being parallel to the ground. By simultaneously extending the hydraulic jacks 24.6 and 24.9, the blade or scoop 26.3 is caused to scrape directly forwardly across the ground, collecting snow or other material without movement of the tractor. If, because of the nature of the material, it is difficult to smoothly scrape the ground, the hydraulic jacks 24.6, 24.9 may be alternately and repeatedly activated to cause the tool to "walk" across the ground and thus more easily scrape the ground. The tool may then be tilted upwardly by retracting hydraulic jack 26.6, and the tool with its load may then be raised by extension of the simultaneously operable hydraulic jacks 20.4, 22.4, or 14.6, or both, the jacks 14.6 normally being used when the load is to be raised to a very high level. If the load is to be deposited to the side, one or the other of the separately operable jacks 24.6, 24.9 is retracted to face the tool to the side.

While we have described a preferred embodiment of the present invention, it should be understood that various changes, adaptations, and modifications may be made therein without departing from the spirit of the invention and the scope of the appended claims.

What is claimed is:

1. A front end loader for a tractor comprising:
   a. a pair of vertically movable, hydraulically actuated overhead booms carried longitudinally of the tractor and terminating in a transverse support bar connecting the booms forwardly of the tractor;
   b. an earth-moving tool supported by a transverse tool frame;
   c. a connector bar extending between opposed ends of the transverse support bar and the tool frame and connected to said bar and frame by hinges permitting movement in a common plane of the tool frame and the transverse support bar; and
   d. separately operable hydraulic jacks connecting respectively the tool frame to the connector bar and the connector bar to the transverse support bar, whereby the earth-moving tool may be extended forwardly of the tractor and retained in a position approximately perpendicular to the line of travel of the tractor or retracted rearwardly by concurrent operation of the hydraulic jacks, and may be faced to the left or the right with respect to the tractor by operation of one of the hydraulic jacks.

2. The front end loader of claim 1 including upright struts mountable to the tractor and each having an upwardly extendible section, the booms being hingedly mounted at their rearward ends to the struts at upper ends of the extendible strut sections, and the struts including simultaneously operable hydraulic jacks for extension and retraction of the struts to raise and lower the booms with respect to the tractor.

3. The front end loader of claim 2 including a second pair of simultaneously operable hydraulic jacks extending respectively between extendible sections of the struts and the booms and pivotally connected to the latter intermediate the length of the booms, simultaneous operation of the second pair of jacks causing the booms to pivot about their hinged connections to the extendible strut sections to raise and lower forward ends of the booms, the angular orientation of the booms with respect to the ground being independent of the degree of extension of the struts.

4. The front end loader of claim 3 wherein the tool is hingedly mounted to the tool frame for upward and downward movement with respect to the latter, the loader including a hydraulic tool jack connecting the tool and the tool frame for tilting the tool with respect to the tool frame.

5. A front end loader for a tractor comprising:
   a. a pair of vertically movable, hydraulically actuated overhead booms carried longitudinally of the tractor and terminating in a transverse support bar connecting the booms forwardly of the tractor;
   b. an earth-moving tool supported by a transverse tool frame;
   c. a connector bar extending between opposed ends of the transverse support bar and the tool frame and connected to said bar and frame by hinges permitting movement in a common plane of the tool frame and the transverse support bar; the tool frame, the support bar, and the connector bar having confronting, mating shoulders so oriented that when the tool frame is completely retracted toward the transverse support bar, an upwardly facing shoulder of the latter bar supports a downwardly facing shoulder of the connector bar, and an upwardly facing shoulder of the connector bar supports a downwardly facing shoulder of the tool frame; and
   d. separately operable hydraulic jacks connecting respectively the tool frame to the connector bar and the connector bar to the transverse support bar, whereby the earth-working tool may be extended forwardly of the tractor or retracted rearwardly by concurrent operation of the hydraulic jacks, and may be faced to the left or to the right with respect to the tractor by operation of one of the hydraulic jacks.

6. A front end loader for a tractor comprising:
   a pair of vertically movable, hydraulically actuated, parallel overhead booms carried longitudinally of the tractor and terminating forwardly in a transverse support bar connecting the booms;
   an earth-moving tool hingedly connected to an elongated, transverse tool frame;
   a connector bar extending between opposed ends of the transverse support bar and the tool frame and mounted thereto by hinges permitting movement in a common plane of the tool frame and the transverse support bar, the tool frame, connecting bar, and transverse support bar having nesting shoulders whereby, when the tool frame is fully retracted, the shoulders nest together, the transverse support bar bearing along its length the weight of the connector bar which in turn bears along its length the weight of the tool frame;
   separately operable hydraulic jacks respectively connecting the tool frame to the connector bar and the connector bar to the transverse support bar;
   a pair of upright struts each having an upwardly extendible section and each respectively mounting an overhead boom to the tractor, the booms being hingedly mounted at their rearward ends to upper ends of the extendible strut sections, the struts including simultaneously operable hydraulic jacks for extension and retraction of the struts to raise and lower the booms with respect to the tractor; and
   a second pair of simultaneously operable hydraulic jacks extending respectively between extendible strut sections and the booms and pivotally connected to the booms intermediate their lengths, operation of said second pair of simultaneously operable jacks causing the booms to pivot about their hinged connections to the extendible strut sections to raise and lower forward ends of the booms, the angular orientation of the booms with respect to the ground being independent of the degree of extension of the struts.

* * * * *